US012657345B2

(12) United States Patent (10) Patent No.: US 12,657,345 B2

Li et al. (45) **Date of Patent: \*Jun. 16, 2026**

(54) SOLUTION FOR TRUSTWORTHY AND SECURITY COMPLIANT EDGE COMPUTING INFRASTRUCTURE

(71) Applicant: Beijing Bytedance Network Technology Co., Ltd., Beijing (CN)

(72) Inventors: Qingkun Li, Los Angeles, CA (US); Fangfei Chen, Los Angeles, CA (US); Yang Yang, Los Angeles, CA (US)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 81 days.

This patent is subject to a terminal disclaimer.

(21) Appl. No.: 18/688,979

(22) PCT Filed: Aug. 25, 2022

(86) PCT No.: PCT/SG2022/050608

§ 371 (c)(1),
(2) Date: Mar. 4, 2024

(87) PCT Pub. No.: WO2023/033724

PCT Pub. Date: Mar. 9, 2023

(65) Prior Publication Data

US 2024/0372831 A1 Nov. 7, 2024

Related U.S. Application Data

(63) Continuation of application No. 17/681,431, filed on Feb. 25, 2022, now Pat. No. 11,481,514.

(Continued)

(51) Int. Cl.
*G06F 21/62* (2013.01)
*H04L 9/40* (2022.01)
(Continued)

(52) U.S. Cl.
CPC .......... *G06F 21/6263* (2013.01); *H04L 12/46* (2013.01); *H04L 41/12* (2013.01);
(Continued)

(58) Field of Classification Search
CPC .... G06F 21/6263; G06F 8/60; G06F 21/6254; H04L 12/46; H04L 41/12; H04L 61/256;
(Continued)

(56) References Cited

U.S. PATENT DOCUMENTS 7,260,649 B1 8/2007 Somasundaram et al.
2010/0057894 A1 3/2010 Glasser
(Continued)

FOREIGN PATENT DOCUMENTS

CN 112910701 A 6/2021
WO 2017/139651 A1 8/2017

OTHER PUBLICATIONS

European Search Report for EP Patent Application No. 22865183.2, Issued on Jul. 1, 2024, 12 pages.
(Continued)

*Primary Examiner* — El Hadji M Sall

(57) ABSTRACT

Systems and method directed to providing a framework for a trustworthy and security compliant edge computing infrastructure are described. Such framework allows self-built edge datacenters to continue providing enhanced service quality in regions where user data and user privacy are of top concerns. In examples, the systems and methods may include an edge router configured to route a communication received from a mobile device to an edge datacenter and provides the request to the edge datacenter. The edge data center may request content and/or services from a technology partner datacenter via an application gateway for security and privacy that is configured to receive the request for content from the edge datacenter and determine if the (Continued)

request for content is associated with user protected information.

5 Claims, 6 Drawing Sheets

Related U.S. Application Data

(60) Provisional application No. 63/240,708, filed on Sep. 3, 2021.

(51) Int. Cl.
  *H04L 12/46* (2006.01)
  *H04L 41/12* (2022.01)
  *H04L 61/256* (2022.01)
  *H04L 67/10* (2022.01)

(52) U.S. Cl.
  CPC ........ *H04L 61/256* (2013.01); *H04L 63/0245* (2013.01); *H04L 63/20* (2013.01); *H04L 67/10* (2013.01)

(58) Field of Classification Search
  CPC ..... H04L 63/0245; H04L 63/20; H04L 67/10; H04L 61/2539; H04L 63/0281; H04L 67/56; H04L 12/12; H04W 12/02; H04W 12/088
  See application file for complete search history.

(56) References Cited

U.S. PATENT DOCUMENTS

| | | | |
|---|---|---|---|
| 2012/0066287 A1 | 3/2012 | Hajost | |
| 2012/0092997 A1* | 4/2012 | Mihaly | H04L 67/56 |
| | | | 370/237 |
| 2012/0113966 A1 | 5/2012 | Tao | |
| 2012/0226799 A1 | 9/2012 | Kapur et al. | |
| 2014/0006411 A1 | 1/2014 | Boldyrev et al. | |
| 2016/0352869 A1 | 12/2016 | Liddicott | |
| 2017/0244637 A1 | 8/2017 | Singhal et al. | |
| 2018/0167483 A1 | 6/2018 | Cannon et al. | |
| 2019/0036876 A1 | 1/2019 | Raza et al. | |
| 2019/0141079 A1* | 5/2019 | Vidas | H04L 63/20 |
| 2019/0377832 A1* | 12/2019 | McLean | H04L 63/20 |
| 2020/0202239 A1* | 6/2020 | Yussouff | G06Q 30/0202 |
| 2020/0259921 A1* | 8/2020 | Luft | H04L 65/1095 |
| 2020/0329008 A1 | 10/2020 | Dao | |
| 2021/0271506 A1* | 9/2021 | Ganguly | H04L 41/04 |
| 2023/0081612 A1* | 3/2023 | Wang | H04L 63/0272 |
| | | | 726/12 |

OTHER PUBLICATIONS

Communication pursuant to Rules 70(2) and 70a(2) EPC for European Application No. 22865183.2, mailed Oct. 17, 2024, 1 page.
International Search Report issued Mar. 24, 2023 in PCT Appl. No. PCT/SG2022/050608 (6 pages).
Written Opinion for International Application No. PCT/SG2022/050608, mailed Mar. 24, 2023, 5 Pages.
European Search Report for EP Patent Application No. 22865183.2, Issued on Sep. 30, 2024, 13 pages.

* cited by examiner

Figure 4:
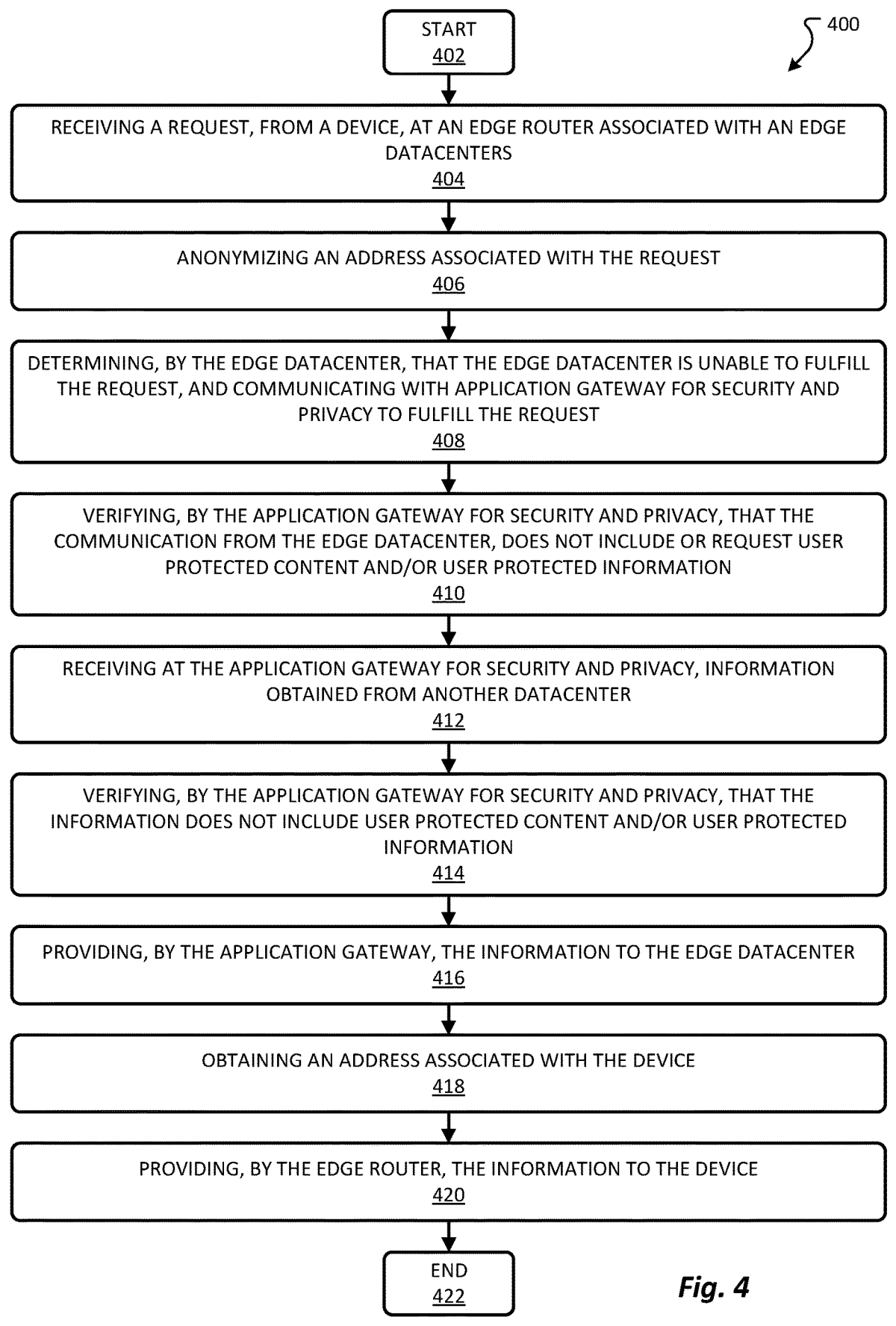

START
402

↓

RECEIVING A REQUEST, FROM A DEVICE, AT AN EDGE ROUTER ASSOCIATED WITH AN EDGE DATACENTERS
404

↓

ANONYMIZING AN ADDRESS ASSOCIATED WITH THE REQUEST
406

↓

DETERMINING, BY THE EDGE DATACENTER, THAT THE EDGE DATACENTER IS UNABLE TO FULFILL THE REQUEST, AND COMMUNICATING WITH APPLICATION GATEWAY FOR SECURITY AND PRIVACY TO FULFILL THE REQUEST
408

↓

VERIFYING, BY THE APPLICATION GATEWAY FOR SECURITY AND PRIVACY, THAT THE COMMUNICATION FROM THE EDGE DATACENTER, DOES NOT INCLUDE OR REQUEST USER PROTECTED CONTENT AND/OR USER PROTECTED INFORMATION
410

↓

RECEIVING AT THE APPLICATION GATEWAY FOR SECURITY AND PRIVACY, INFORMATION OBTAINED FROM ANOTHER DATACENTER
412

↓

VERIFYING, BY THE APPLICATION GATEWAY FOR SECURITY AND PRIVACY, THAT THE INFORMATION DOES NOT INCLUDE USER PROTECTED CONTENT AND/OR USER PROTECTED INFORMATION
414

↓

PROVIDING, BY THE APPLICATION GATEWAY, THE INFORMATION TO THE EDGE DATACENTER
416

↓

OBTAINING AN ADDRESS ASSOCIATED WITH THE DEVICE
418

↓

PROVIDING, BY THE EDGE ROUTER, THE INFORMATION TO THE DEVICE
420

↓

END
422

SOLUTION FOR TRUSTWORTHY AND SECURITY COMPLIANT EDGE COMPUTING INFRASTRUCTURE

CROSS-REFERENCE TO RELATED APPLICATIONS

This application is a national stage application filed under 35 U.S.C. 371 based on International Patent Application No. PCT/SG2022/050608, filed Aug. 25, 2022, which claims priority to U.S. Provisional Application No. 63/240,708, entitled "SOLUTION FOR TRUSTWORTHY AND SECURITY COMPLIANT EDGE COMPUTING INFRASTRUCTURE" and filed on Sep. 3, 2021, and U.S. application Ser. No. 17/681,431, titled SOLUTION FOR TRUSTWORTHY AND SECURITY COMPLIANT EDGE COMPUTING INFRASTRUCTURE and filed on Feb. 25, 2022, the entire contents of those applications being incorporated herein by reference in their entirety.

BACKGROUND

Edge datacenters and edge computing technologies, such as content distribution networks (CDNs), are widely used to enhance service quality by running services and caching contents closer to end-users. Many companies adopt self-built edge datacenters to reduce cost and further improve service quality by using private software stacks and protocols that commercial vendors do not support but are otherwise made available by the self-built edge datacenter. However, using private software in self-built edge datacenters may bring risks in user privacy. For example, user information including, but not limited to, user internet protocol addresses, usernames, passwords, payment information, and other user sensitive data may be identified, tracked, and/or otherwise compromised. Accordingly, such potential security issues may jeopardize the adoption of self-built edge datacenters in regions governed by national and/or geographic user and data privacy regulations, where user data and user privacy are of top concerns.

Oftentimes, even if a central datacenter, such as a Technology Partner (TP) appointed by a local government, is involved and provides a trusted infrastructure for a company to operate on or otherwise use, it is often difficult if not impossible for the TP to provide the needed secure edge infrastructure due to its wide distribution nature and use. Accordingly, a solution is lacking that integrates a trusted edge infrastructure with a TP thereby adhering to user and data privacy laws and regulations.

BRIEF SUMMARY

In accordance with examples of the present disclosure, a generalized solution and framework are described that provide a trustworthy and security compliant edge computing infrastructure. Such framework allows self-built edge datacenters to continue providing enhanced service quality in regions where user data and user privacy are of top concerns.

In accordance with examples of the present disclosure, a system for providing an edge computing infrastructure is described. The system may include an edge router configured to route a communication received from a mobile device to an edge datacenter, wherein the communication includes a request for content; the edge datacenter including an edge service implementation configured to locate content in response to the request for content received from the mobile device via the edge router, and provide such located content to the mobile device via the edge router; a technology partner datacenter including a central service implementation configured to provide requested content to the edge datacenter in response to a request for content received from the edge datacenter; and an application gateway for security and privacy configured to receive the request for content from the edge datacenter and determine if the request for content is associated with user protected information, wherein when the request for content is not associated with user protected information, the application gateway for security and privacy is configured to route the request for content to the technology partner datacenter, wherein the technology partner datacenter is configured to provide the requested content to the edge datacenter via the application gateway.

In accordance with examples of the present disclosure, a method for servicing a request from a mobile device is described. The method may include routing, via an edge router associated with an edge datacenter, a communication received from a mobile device to the edge datacenter, wherein the communication includes a request for content; locating, via the edge datacenter, content in response to the request for content received from the mobile device via the edge router; receiving, at an application gateway for security and privacy, the request for content from the edge datacenter and determining if the request for content is associated with user protected information; routing, by the application gateway for security and privacy, the request for content to the technology partner datacenter when the request for content is not associated with user protected information; providing, by the technology partner datacenter, the requested content to the application gateway for security and privacy; routing, by the application gateway for security and privacy, the requested content to the edge datacenter; and providing the requested content to the mobile device via the edge router.

In accordance with examples of the present disclosure, a system for providing an edge computing infrastructure. The system may include a software repository maintained by a technology partner datacenter; a deployment agent at an edge datacenter; a deployment platform at the technology partner datacenter, wherein the deployment platform is configured to generate deployment metadata for a software application located within the software repository, and provide the deployment metadata to the deployment agent located at the edge datacenter via a third-party gateway for security and privacy located at the technology partner datacenter; and a deployment agent configured to obtain the software application from a software deployment gateway located at the technology partner datacenter based on the deployment metadata.

BRIEF DESCRIPTION OF THE DRAWINGS

Non-limiting and non-exhaustive examples are described with reference to the following Figures.

FIG. 4 depicts a method for servicing a request from a mobile device via the trustworthy and security compliant edge computing infrastructure in accordance with examples of the present disclosure.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
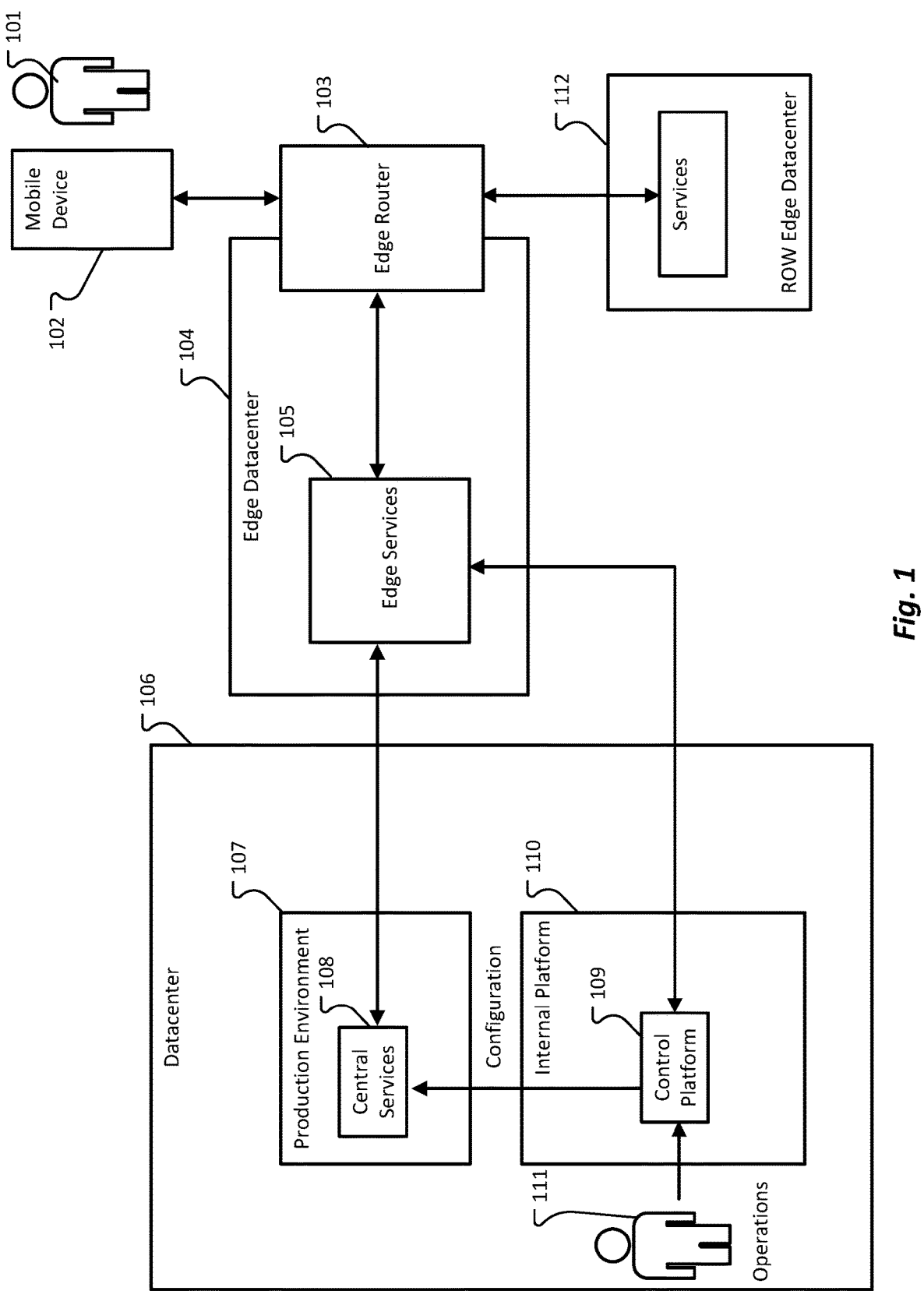
FIG. 1 depicts an example solution and framework that provides enhanced service quality in accordance with examples of the present disclosure.

FIG. 1 depicts an example solution and framework that provides enhanced service quality in accordance with examples of the present disclosure. The framework depicted in FIG. 1 executes, or runs, services as well as provides cached contents closer to end-users. In examples, the cached contents may be closer to the end-user in terms of proximity and/or network throughput. The framework depicted in FIG. 1 allows an end-user 101 to access content, such as but not limited to video content, audio content, and one or more services provided by a datacenter. In examples, the end-user 101 may request content using a mobile device 102 for example; the request may be sent to an edge router 103; the edge router 103 may be associated with an edge datacenter 104 and may route requests received from the mobile device 102 to an appropriate edge services 105 located at a selected edge datacenter 104. The edge datacenter 104 may be a self-built datacenter such that a company or organization has all control of the edge datacenter 104. The edge service 105 may determine whether the content request from the mobile device 102 at the edge router 103 is cached locally at the edge datacenter 104. If the content is cached locally at the edge datacenter 104, then the edge services 105 may locate the cached content and provide the cached content to the edge router 103, which may then route or otherwise provide the content to the mobile device 102.

In some examples, the edge service 105 may determine that the requested content is not located at or otherwise available at the edge datacenter 104. Accordingly, the edge services 105 may submit a request to a datacenter 106 for such content. The datacenter 106 may receive the request within a production environment 107; the production environment 107 may include one or more central services 108 for identifying a location of the requested content, fetching the requested content from the location in the datacenter 106, and then providing the requested content back to the edge service 105. In examples, the requested content may then be cached at the edge datacenter 104 for later use by one or more mobile devices 102.

In examples where the edge datacenter 104 may communicate with the Rest Of the World (ROW) edge datacenter 112, a request coming from the mobile device 102 may go through and be processed by the edge service 105, then get forwarded to ROW Edge datacenter 112. The ROW edge datacenter is a central datacenter that may not be approved for access by a government, jurisdictional, or local entity. Accordingly, the ROW edge datacenter cannot directly serve content to users when the users are located in specific non-approved geographic regions. The connection between the edge datacenter 104 and the ROW edge datacenter 112 can be used to serve public content, such as a user's published public content, to the different geographic regions (e.g., the rest of the world) or may be used to receive public content, such as a user's published public content, from different geographic regions. In examples, because a connection exists between a mobile device, the edge router 103, and the ROW edge datacenter 112, there is a possibility that a request from the mobile device 102 may be routed by the edge router 103 directly to the ROW edge datacenter 112, without going through and being processed by the edge services 105. In this case the ROW edge datacenter 112 may see or have access to sensitive user information that would otherwise be processed and/or filtered by the edge services 105.

In some examples, the datacenter 106 may include a control platform 109; the control platform 109 may be responsible for deploying one or more edge services 105 to the edge datacenter 104. An operations user 111 may reside in an operation center of the datacenter 106 and may have access to the control platform 109 via an internal platform 110. The operations user 111 may cause the control platform 109 to deploy a service, such as but not limited to a cache or caching service, to the edge datacenter 104. In examples, the operations user 111 may login or otherwise be authenticated to the control platform 109 to deploy the service to the edge services 105. While the communication between the operations user 111 and the control platform 109, the control platform 109 and the edge datacenter 104, the authentication of the operations user 111, and the data ingress and egress from the datacenter 106 and the edge datacenter 104 may be logged, in examples where the datacenter 106 is maintained or controlled by one organization or company and the edge datacenter 104 is controlled or maintained by another organization or company, the framework depicted in FIG. 1 may lack components and processes needed to impart a certain trust level associated with the datacenter 106 to the edge datacenter 104, as the edge datacenter 104 may be operated, controlled, maintained, accessed, etc. by different operations users and different staff than the datacenter 106. In addition, the datacenter 106 may be governed by different data and user privacy regulations than the edge datacenter 104. Accordingly, one or more components and processes may be added to the framework depicted in FIG. 1 to impart a trust level associated with the datacenter 106 to the edge datacenter 104.

Figure 2:
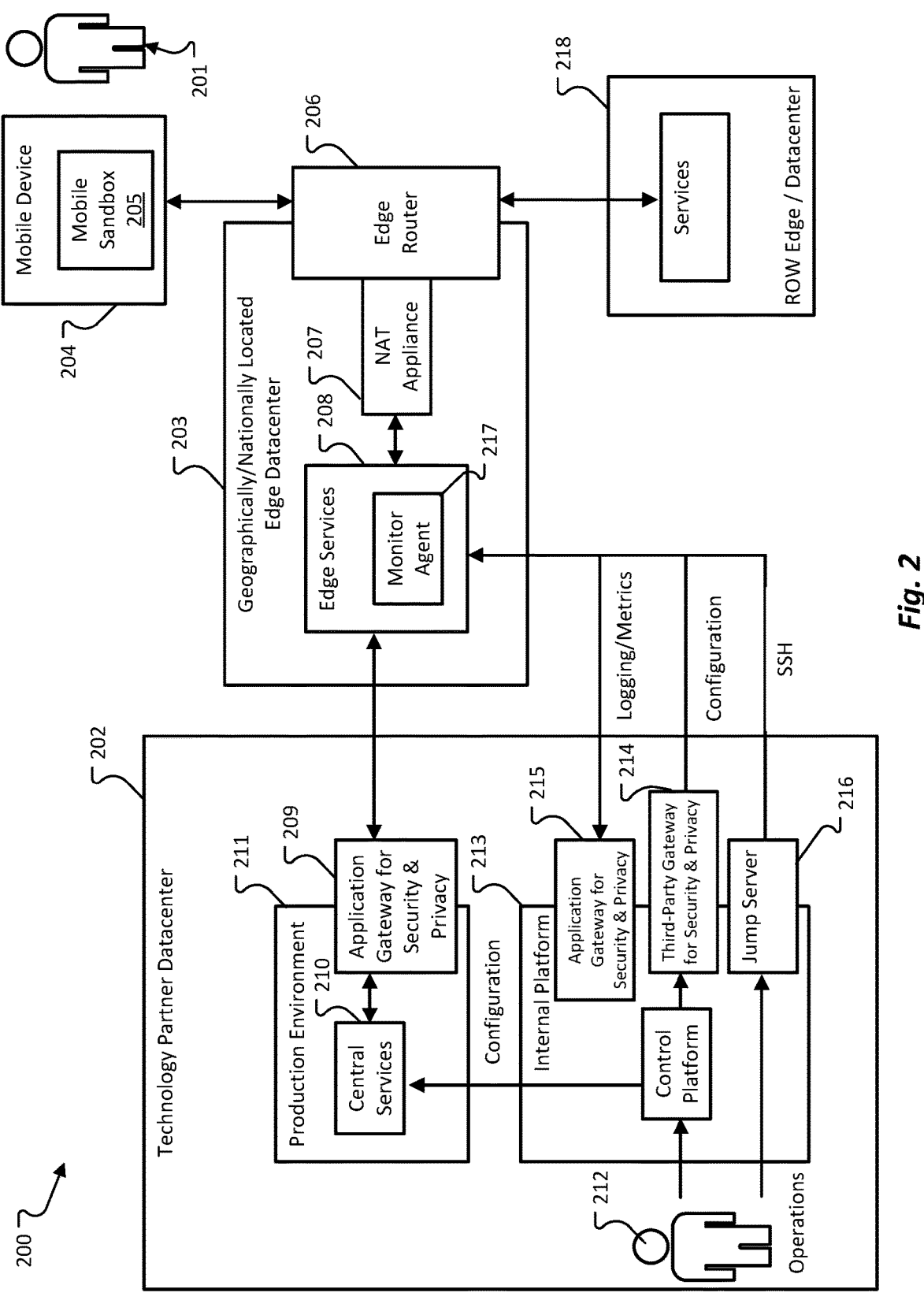
FIG. 2 depicts an example of a generalized solution and framework that provides a trustworthy and security compliant edge computing infrastructure in accordance with examples of the present disclosure.

FIG. 2 depicts an example of a generalized solution and framework that provides a trustworthy and security compliant edge computing infrastructure in accordance with examples of the present disclosure. The framework depicted in FIG. 2 allows self-built edge datacenters to continue providing enhanced service quality in regions where user data and user privacy are of top concerns. Similar to FIG. 1, the framework depicted in FIG. 2 allows an end-user, such as the end-user 201, to request access to content or services provided by or otherwise located at a datacenter via an edge datacenter. In the framework of FIG. 2, the datacenter may be a technology partner (TP) datacenter 202 and may be approved by one or more organizations, government entities, or the like. In examples, the TP datacenter 202 may be a central datacenter infrastructure provided by the TP where central services are run and user data is stored. In some examples, the technology partner (TP) may be appointed and/or trusted by one or more of the local governments, a jurisdictional entity, an agency, and/or other entities. Alternatively, or in addition, the TP datacenter 202 may be designated as complying with one or more data privacy and/or user privacy regulations or security levels as evidenced by a certification of such compliance. For example, the TP datacenter 202 may be audited on a regular or otherwise periodic basis to achieve and/or maintain such designation. Accordingly, the framework depicted in FIG. 2 allows the trustworthy level status associated with the TP datacenter 202 to be imparted or otherwise extended to the edge datacenter 203, which may be a geographically/nationally located edge datacenter that is located in the same jurisdiction or geographic region as the TP datacenter 202. The edge datacenter 203 may be a self-built datacenter serving geographically grouped users and owned or otherwise operated by an entity that is different from the entity owning and/or operating the TP datacenter 202.

In examples, an end-user 201 may make a request for content or a request for service via the mobile device 204. For example, the mobile device 204 may include an app or application configured to provide video data, audio data, or other information to the end-user 201, where such information may be provided from the TP datacenter 202 and/or the edge datacenter 203. Accordingly, the mobile device 204 may initiate a request for content (e.g., using an API of the app or application) to a closest (e.g., in proximity or speed) edge datacenter as determined by the edge router 206. The router or switch 206 device routes all network traffic into and out of the edge datacenter 203. Prior to the request and/or as part of the request, a mobile sandbox 205 existing on the mobile device 204 (e.g., as part of the app or application used by the end-user 201 and provided by the technology partner) may intercept, monitor, and/or audit the request to the edge datacenter 203 to verify user protected content or user protected information is not included in the request. In examples, the sandbox environment 205 may intercept and validate API calls sent from the user client service (e.g. mobile app on the mobile device 204). In some examples, if user protected content or user protected information is included in the request, the mobile sandbox 205 may deny the communication from the mobile device 204 to the edge datacenter 203. Accordingly, an API associated with the mobile sandbox 205, or the app or application running on the mobile device 204, may send the request to the edge router 206, where the edge router 206 may determine the appropriate edge datacenter 203 for service or providing the requested content or service. That is, although the edge router 206 is depicted as residing on a part of the edge datacenter 203, the edge router 206 may send the request from the mobile device 204 to an edge datacenter that is different from the edge datacenter 203.

In examples, the request received by the edge router 206 may be anonymized using a network address translation (NAT) appliance 207. The NAT appliance 207 may translate an internet protocol (IP) address associated with the mobile device 204 to an anonymous IP address such that the edge datacenter 203 does not have or otherwise have access to the IP address associated with the mobile device 205 and/or associated with the end-user 201. The NAT appliance 207 utilizes dynamic source IP address translation. Accordingly, the edge datacenter 203 works with the randomized IP address associated with the end-user 201; when providing the requested content or service to the mobile device 204, the NAT appliance 207 may translate the anonymized IP address back to the IP address associated with the end-user 201 or otherwise the mobile device 204. Accordingly, the NAT appliance 207 maintains a table associating the anonymized IP address to the IP address associated with the end-user 201 and/or the mobile device 204. Thus, user behavior associated with an IP address of an end-user's mobile device 204 cannot be tracked by the edge datacenter 203.

In instances where the end-user requested content or service can be provided by the edge datacenter 203, for example if the requested content is cached at the edge datacenter 203, the edge services 208 of the edge datacenter 203 may communicate with the NAT appliance 207, where the NAT appliance 207 communicates with the edge router 206 to route the requested content or service to the mobile device 204 associated with the end-user 201. In examples where the edge datacenter 203 does not have the requested content (e.g., the content is not cached at the edge datacenter 203) or otherwise cannot provide the requested service to the mobile device 204, the edge services 208 of the edge datacenter 203 may communicate with the TP datacenter 202 to retrieve the content and/or the information needed for the service. In accordance with examples of the present disclosure, the request may be sent from the edge services 208 of the edge datacenter 203 to the application gateway for security and privacy 209. The application gateway for security and privacy 209 may reside at the TP datacenter 202 or in front of the TP datacenter 202 and provide access to the central services 210 and content of the production environment 211. In examples, the application gateway for security and privacy 209 may ensure that the request from the edge service 208 of the edge datacenter 203 does not include user protected content or user protected information and/or does not include a request for user protected content and/or user protected information. Accordingly, user protected content and/or user protected information residing at the TP datacenter 202 (for example, as a user profile) cannot be accessed or otherwise requested from the edge service 208 of the edge datacenter 203. Once the content and/or service is identified at the central service 210, for example in the production environment 211, the requested content or service is provided via the application gateway for security and privacy 209 to the edge services 208 of the edge datacenter 203. The edge services 208 of the edge datacenter 203 then provides the content to the NAT appliance 207 as previously described.

In examples, operations users 212 associated with the internal platform 213 (e.g., control platform) of the TP datacenter 202 may deploy content and/or services to the edge datacenter 203 using a third-party gateway for security and privacy 214. The operations users 212 may have access to user data for geographically separated or grouped users and perform operations in the TP datacenter 202. For example, operations users 212 may have access to user account information to perform user account maintenance (e.g., enable/disable an account, force a password reset, etc.), backup user account data, and/or assist with other user requests, for a user located in a geographic area or group that is the same as the TP datacenter 202. However, operations users 212 for the ROW edge datacenter 218 would not have access to user account information to perform user account maintenance, backup, or other operations involving user data.

The third-party gateway for security and privacy 214 may protect the connection from the TP datacenter 202 to the edge datacenter 203. If a connection request is made from the edge datacenter 203 to the internal platform 213 of the TP datacenter 202, such request is directed to the application gateway for security and privacy 215. The application gateway for security and privacy 215 and the third-party gateway for security and privacy 214 may include one or more communication restrictions (e.g., restricted traffic created via one or more ingress/egress rules). Accordingly, the connection requests and the communications occurring from the third-party gateway for security and privacy 214 and/or to the application gateway for security and privacy 215 may be logged and/or audited and/or may be filtered according to the communication restrictions.

In examples where troubleshooting services are needed to evaluate or troubleshoot one or more portions of the edge datacenter 203, the operations users 212 associated with the internal platform 213 may utilize a jump server 216 to connect to the edge datacenter 203. The jump server 216 is a server used by operations users to log into (via SSH for example) the edge servers and services located at the edge datacenter 203. For example, operations users 212 associated with the TP datacenter 203 may troubleshoot the edge services 208 located at the edge datacenter 203, where the TP datacenter 202 is owned or controlled by an entity or organization that is different from the entity or organization that owns or controls the edge datacenter 203. Accordingly, additional logging information may be acquired by the jump server 216 for analysis and/or use by the TP datacenter 202 and/or the owner/controller of the edge datacenter 203.

The edge services 208 of the edge datacenter 203 may additionally include a monitor agent 217. The monitor agent 217 may monitor actions of the edge services 208 to ensure the edge datacenter 203 is not communicating with or otherwise sending protected information to an untrusted domain. In examples, the monitor agent 217 runs on the edge datacenter 203 to monitor edge services and traffics.

In examples where the edge datacenter 203 may communicate with the ROW edge datacenter 218, the edge router 206 may restrict ingress and egress communications to prevent user protected content or user protected information associated with the mobile device 204 from reaching the ROW edge datacenter 218. For example, if a request coming from the mobile device 204 traverses or otherwise goes through the edge datacenter 203, such request is prevented from being directly routed to the ROW edge datacenter 218 via the edge router 206. Similar to the edge services 208, the edge router 206 may log, monitor, or otherwise allow an entity to monitor traffic flowing into and out of the edge router 206.

In accordance with examples of the present disclosure, all production data flowing into and out of the edge datacenter 203 is protected. For example, a data flow involving a user client service (e.g., mobile app) to the edge datacenter 203 may be protected as follows: the connections initiated by geographically grouped users to communicate with the edge datacenter 203 will be validated by the mobile sandbox 205 and pass through the NAT appliance 207. The mobile sandbox 205 ensures geographically grouped users can only communicate with the edge datacenter 203 and that no protected user data can be sent to the edge datacenter 203. The NAT appliance 207 anonymizes user addresses (e.g., IP address) to protect the geographically grouped users from being tracked or otherwise prevent the true non-anonymized address from being known or otherwise available at the edge services 208 or elsewhere.

In accordance with examples of the present disclosure, data flow between the edge datacenter 203 and the TP datacenter 202 is protected as follows: connections initiated by edge datacenter 203 to communicate with the TP datacenter 202, e.g. send service data and logs/metrics, are routed to the application gateway for security and privacy 209, which ensures no protected user data will inadvertently be passed to a non-approved location; connections initiated by the TP datacenter 202 to communicate with the edge datacenter 203, e.g. make configuration changes, are routed through the third-party gateway for security and privacy 214 which ensures no protected user data will be sent or passed; and all SSH operations by operations users 212 performed at the edge datacenter 203 must be performed through the jump server 216, which can readily be audited by the TP.

In accordance with examples of the present disclosure, data flow between the edge datacenter 203 and the ROW edge datacenter 218 is protected as follows: firewall rules of the edge router 206 restrict data from flowing to the ROW edge datacenter 218 from a mobile device 204; the edge router 206 can be audited by the TP.

Figure 3:
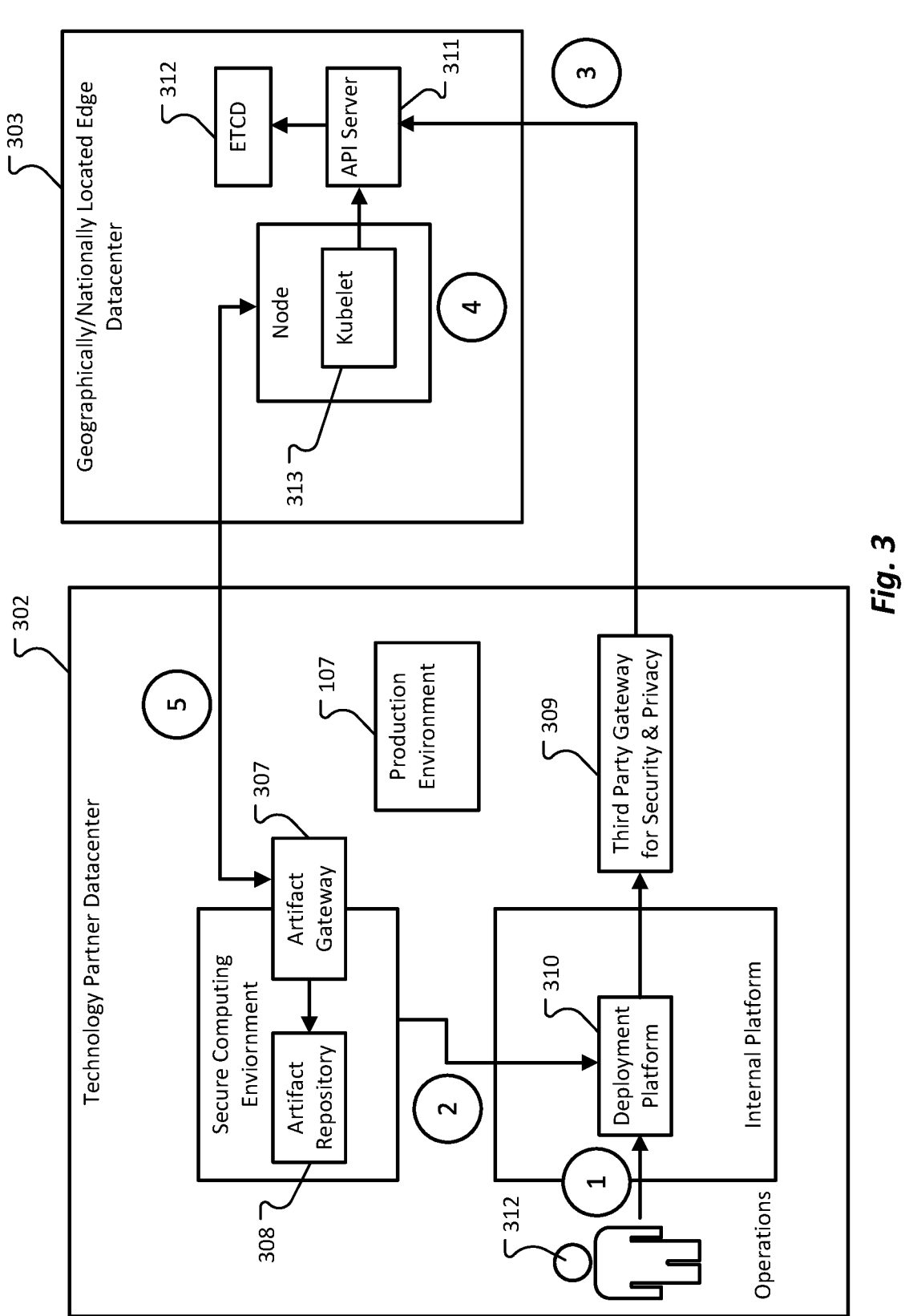
FIG. 3 depicts an example software deployment process in accordance with examples of the present disclosure.

FIG. 3 depicts a software deployment process to ensure software deployed on the edge datacenter 303 is trusted, in accordance with examples of the present disclosure. The deployment process may utilize Kubernetes image deployment as an example. The same or similar process also applies to other forms of image deployment or binary deployment, where Kubernetes (e.g. API Server 311, Kubelet 313, ETCD 312) may be replaced with other deployment agents on the edge datacenter 303. Thus, operations users 312 will interact with a deployment platform in TP Datacenter 302 to deploy software.

In examples, an image list is queried through the artifact gateway 307 and operations users 312 can select which software to deploy from the queried list at step 1. The artifact repository 308 may be owned by the TP datacenter 302. The software within the artifact repository 308 may be compiled and built through strict security scanning process provided by TP and thus is assumed to be secure and trusted. The artifact gateway 307 can be audited by TP, which prevents un-scanned software from being read and further validates the signature of scanned software when being downloaded. Thus, the deployment platform 310 receives the software at step 2 and generates the Kubernetes deployment metadata and sends it to edge datacenter 303 through the third-party gateway for security and privacy 309 at step 3, so that the deployment traffic can be validated and audited by TP. The deployment agent (e.g. Kubelet) on the edge datacenter may read the new deployment metadata at step 4. Accordingly, the software image specified in the deployment metadata is then downloaded or otherwise validated through the artifact gateway 307 at step 5, to ensure that the software or image requested via the third-party gateway for security and privacy is obtained from the artifact repository owned and/or maintained by the TP.

Referring now to FIG. 4, a simplified method 400 for servicing a request from a mobile device via the trustworthy and security compliant edge computing infrastructure 200 of FIG. 2 is described in accordance with examples of the present disclosure. A general order for the steps of a method 400 is shown in FIG. 4. Generally, the method 400 starts at 402 and ends at 422. The method 400 may include more or fewer steps or may arrange the order of the steps differently than those shown in FIG. 4. The method 400 can be executed as a set of computer-executable instructions executed by one or more computing systems and encoded or stored on a computer-readable medium. In an illustrative aspect, the method 400 is executed by a plurality of computing systems trustworthy and security compliant edge computing infrastructure 200. However, it should be appreciated that aspects of the method 400 may be performed by one or more processing devices, such as a computer, server, or other hardware element. Further, the method 400, in part or in whole, can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1-3.

The method 400 starts at 402, where flow may proceed to 404. At 404, an end-user may make a request for content or a request for service via a mobile device. For example, the mobile device may include an app or application configured to provide video data, audio data, or other information to the end-user. Accordingly, the mobile device may initiate a request for content (e.g., using an API of the app or application) to a closest (e.g., in proximity or speed) edge datacenter as determined by an edge router. The edge router routes network traffic into and out of an edge datacenter. In examples, prior to the request and/or as part of the request, a mobile sandbox existing on the mobile device (e.g., as part of the app or application used by the end-user and provided by the technology partner) may intercept, monitor, and/or audit the request to the edge datacenter to verify user protected content or user protected information is not included in the request. In examples, the sandbox environment may intercept and validate API calls sent from the user client service (e.g. mobile app on the mobile device). In some examples, if user protected content or user protected information is included in the request, the mobile sandbox may deny the communication from the mobile device to the edge datacenter. Accordingly, an API associated with the mobile sandbox, or the app or application running on the mobile device, may send the request to the edge router, where the edge router may determine the appropriate edge datacenter for service or providing the requested content or service.

The method 400 may then proceed to 406, where an address associate with the mobile device may be anonymized. In examples, the request received by the edge router may be anonymized using a network address translation (NAT) appliance. The NAT appliance may translate an internet protocol (IP) address associated with the mobile device to an anonymous IP address such that the edge datacenter does not have or otherwise have access to the IP address associated with the mobile device and/or associated with the end-user. The NAT appliance utilizes dynamic source IP address translation. Accordingly, the edge datacenter works with the randomized IP address associated with the end-user; when providing the requested content or service to the mobile device, the NAT appliance may translate the anonymized IP address back to the IP address associated with the end-user or otherwise the mobile device. Accordingly, the NAT appliance maintains a table associating the anonymized IP address to the IP address associated with the end-user and/or the mobile device. Thus, user behavior associated with an IP address of an end-user's mobile device cannot be tracked by the edge datacenter.

The method 400 may then proceed to 408, where the edge datacenter may determine that the content or service cannot be provided by said edge datacenter and a request may need to be sent to an application gateway for security and privacy. That is, in instances where the end-user requested content or service can be provided by an edge datacenter in which the request was routed to, for example if the requested content is cached at the edge datacenter, the edge datacenter may communicate with the NAT appliance, where the NAT appliance communicates with the edge router to route the requested content or service to the mobile device associated with the end-user (e.g., steps 418 and 420). In examples where the edge datacenter does not have the requested content (e.g., the content is not cached at the edge datacenter) or otherwise cannot provide the requested service to the mobile device, the edge datacenter may communicate with the TP datacenter to retrieve the content and/or the information needed for the service. In accordance with examples of the present disclosure, the request may be sent from the edge datacenter to the application gateway for security and privacy. At 410, the application gateway for security and privacy, residing at the TP datacenter or in front of the TP datacenter and providing access to central services and content available in a production environment of the TP datacenter, may ensure that the communication from the edge datacenter does not include user protected content or user protected information and/or does not include a request for user protected content and/or user protected information. Accordingly, user protected content and/or user protected information residing at the TP datacenter (for example, as a user profile) cannot be accessed or otherwise requested from the edge datacenter. Once the content and/or service is identified at the central service, for example in the production environment, the requested content or service is provided to the application gateway for security and privacy at 412 such that the application gateway for security and privacy can verify that the content and/or service does not include user protected information and/or user protected content (e.g., 414). The method 400 may proceed to 416, where such that the application gateway for security and privacy can provide the content and/or service to the edge datacenter. At 418, the edge datacenter may provide the content to the NAT appliance, where the NAT appliance may translate the anonymized IP address back to the IP address associated with the end-user or otherwise the mobile device. The edge router may then receive or otherwise route the content and/or service to the end-user, mobile device, or mobile sandbox at 420. The method 400 may then end at 422.

Figure 5:
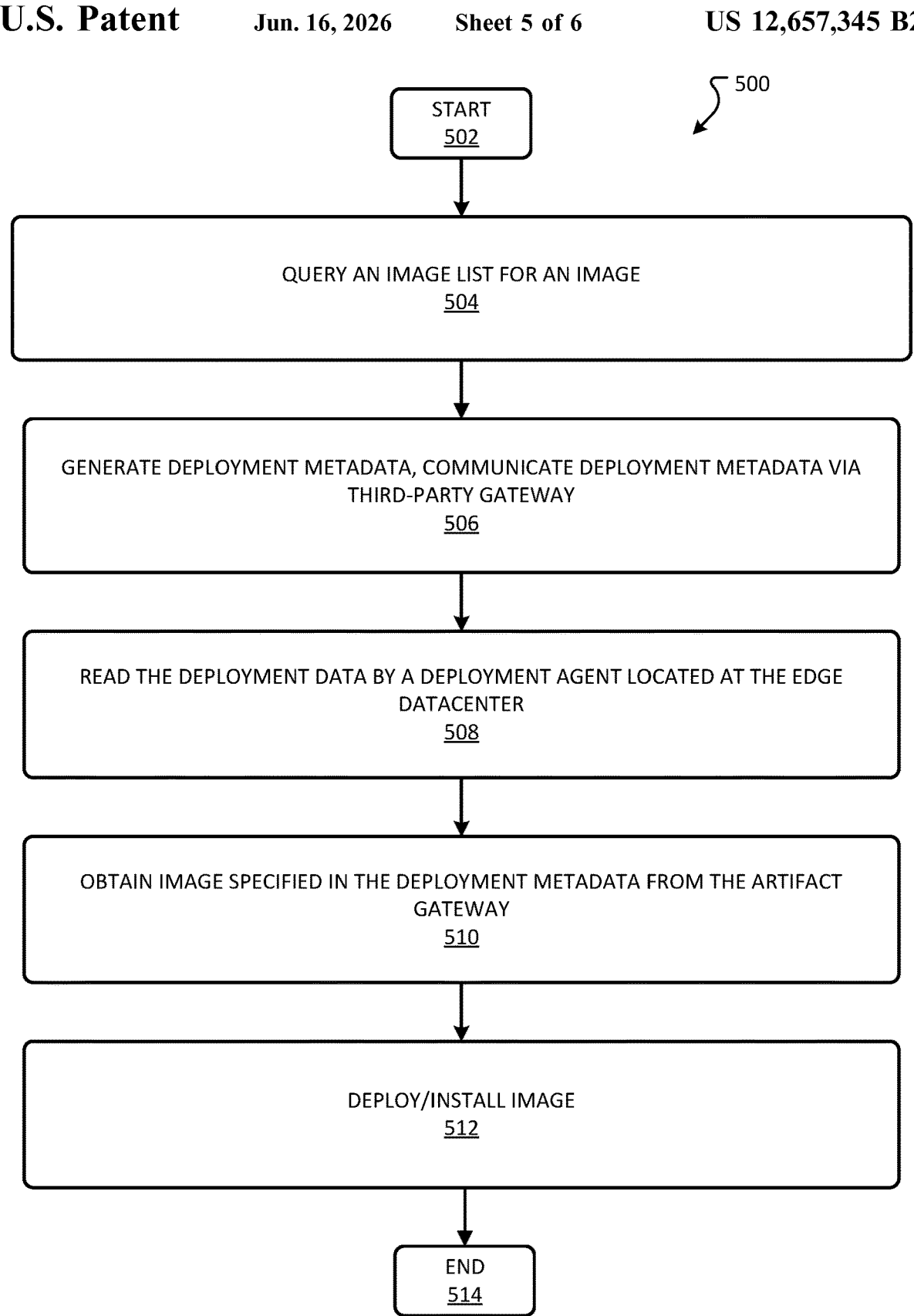
FIG. 5 depicts a method for deploying software to an edge datacenter from a TP datacenter in accordance with examples of the present disclosure.

Referring now to FIG. 5, a simplified method for deploying software to the edge datacenter from the TP datacenter is described in accordance with examples of the present disclosure. A general order for the steps of a method 500 is shown in FIG. 5. Generally, the method 500 starts at 502 and ends at 510. The method 500 may include more or fewer steps or may arrange the order of the steps differently than those shown in FIG. 5. The method 500 can be executed as a set of computer-executable instructions executed by one or more computing systems and encoded or stored on a computer-readable medium. In an illustrative aspect, the method 500 is executed by a plurality of computing systems trustworthy and security compliant edge computing infrastructure 200. However, it should be appreciated that aspects of the method 500 may be performed by one or more processing devices, such as a computer, server, or other hardware element. Further, the method 500, in part or in whole, can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, user interfaces, etc. described in conjunction with FIGS. 1-4.

The method 500 starts at 502, where flow may proceed to 504. At 504, an image list at a TP datacenter may be queried through the artifact gateway and operations users of the TP datacenter can select which software to deploy from the queried list. For example, an image may be directed to an image of an update that is to be applied to one or more devices, services, etc. provided by the edge datacenter. The artifact repository may be owned and/or maintained by the TP datacenter. The software within the artifact repository may be compiled and built through strict security scanning process provided by TP and thus is assumed to be secure and trusted. The artifact gateway can be audited by TP, which prevents un-scanned software from being read and further validates the signature of scanned software when being downloaded.

At 504, a deployment platform may receive the selected software (e.g., image) and generate deployment metadata that is then provided to the edge datacenter through a third-party gateway for security and privacy at 506. That is, by communicating deployment metadata and/or deployment parameters to the edge datacenter from the TP datacenter via the third-party gateway, the deployment traffic can be validated and audited by TP. At 508, a deployment agent located on the edge datacenter may read the new deployment metadata. At 510, the software image specified in the deployment metadata is then obtained or otherwise downloaded through an artifact gateway to ensure that the software or image requested via the third-party gateway for security and privacy is obtained from the artifact repository owned and/or maintained by the TP. At 512, the image may be deployed or otherwise installed at the edge datacenter. The method 500 may then end at 514.

Figure 6:
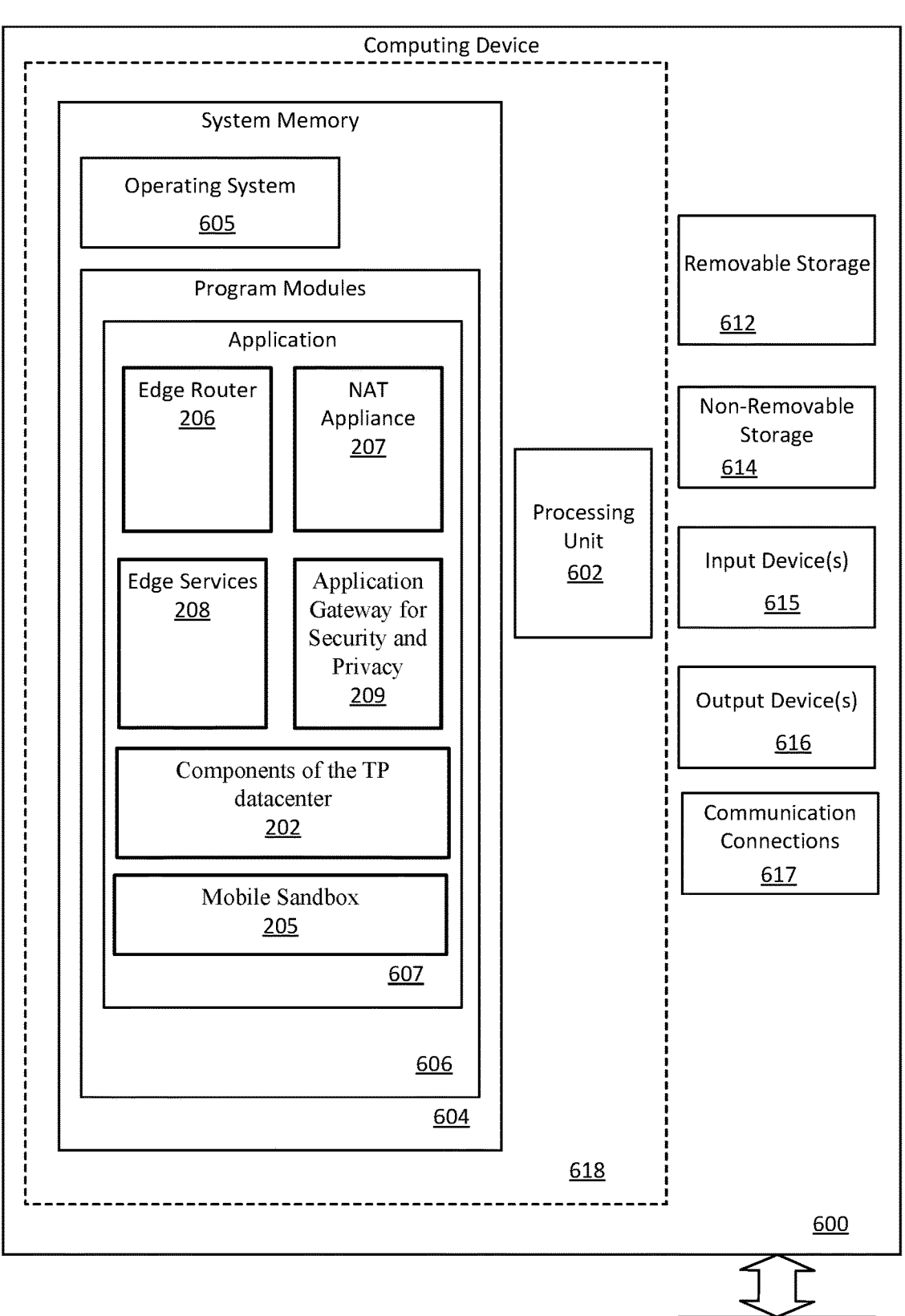
FIG. 6 depicts a block diagram illustrating physical components (e.g., hardware) of a processing device with which aspects of the disclosure may be practiced.

FIG. 6 is a block diagram illustrating physical components (e.g., hardware) of a processing device 600 with which aspects of the disclosure may be practiced. For example, the processing device 600 may represent one or more components as depicted and/or described in FIGS. 1-5. In a basic configuration, the processing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for performing the various aspects disclosed herein such. The operating system 605, for example, may be suitable for controlling the operation of the processing device 600. Furthermore, aspects of the disclosure may be practiced in conjunction with other operating systems, or any other application program and is not limited to any particular application or system. This basic configuration is illustrated in FIG. 6 by those components within a dashed line 608. The processing device 600 may have additional features or functionality. For example, the processing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, several program modules and data files may be stored in the system memory 604. While executing on the at least one processing unit 602, the application 607 or the program modules 606 may perform processes including, but not limited to, one or more aspects, as described herein. The application 607 may include one or more of the mobile sandbox 205, edge router 206, NAT appliance 207, edge services 208 of the edge datacenter 203, application gateway for security and privacy 209, and one or more components of the TP datacenter 202, as described in more detail with regard to FIGS. 1-5. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the processing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The processing device 600 may also have one or more input device(s) 615 such as a keyboard, a mouse, a pen, a sound or voice input device, a touch or swipe input device, etc. The output device(s) 616 such as a display, speakers, a printer, etc. may also be included. The aforementioned devices are examples and others may be used. The processing device 600 may include one or more communication connections 617 allowing communications with other computing or processing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 612, and the non-removable storage device 614 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 600. Any such computer storage media may be part of the processing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to an application gateway for security and privacy according to at least the examples provided in the sections below:

(A1) In one aspect, some examples include a system for providing an edge computing infrastructure. The system may include an edge router configured to route a communication received from a mobile device sandbox of the mobile device to a network address translation appliance, the network address translation appliance associating an anonymous internet protocol address with an internet protocol address associated with the mobile device, wherein the communication includes a request for content; an edge datacenter including an edge service implementation configured to locate content in response to the request for content received from the mobile device via the network address translation appliance, and provide such located content to the mobile device via the network translation appliance and the edge router; a technology partner datacenter including a central service implementation configured to provide requested content to the edge datacenter in response to a request for content received from the edge datacenter; and an application gateway for security and privacy configured to receive the request for content from the edge datacenter and determine if the request for content is associated with user protected information, wherein when the request for content is not associated with user protected information, the application gateway for security and privacy is configured to route the request for content to the technology partner datacenter, wherein the technology partner datacenter is configured to provide the requested content to the edge datacenter via the application gateway.

(A2) In some examples of A1, the edge service implementation determines whether content requested from the mobile device is cached locally at the edge datacenter.

(A3) In some examples of A1-A2, the edge service implementation sends the request for content to the application gateway for security and privacy when the edge service implementation determines that the content requested from the mobile device not cached locally at the edge datacenter.

(A4) In some examples of A1-A3, the edge router is configured to restrict communication between the edge datacenter and a datacenter located in a region that is jurisdictionally different from the edge datacenter.

(A5) In some examples of A1-A4, the edge router is configured to restrict communication between the mobile device and a datacenter located in a region that is jurisdictionally different from the edge datacenter.

(A6) In some examples of A1-A5, the technology partner datacenter is at least one of owned or controlled by an entity that is different from an entity that at least one of owns or controls the edge datacenter.

(A7) In some examples of A1-A6, the system further comprising: a software repository maintained by the technology partner datacenter; a deployment platform at the technology partner datacenter; a third-party gateway for security and privacy at the technology partner datacenter; a deployment agent at the edge datacenter; and a software deployment gateway at the technology partner datacenter, wherein, the technology platform is configured to generate deployment metadata for a software application located within the software repository, and provide the deployment metadata to the deployment agent located at the edge datacenter via the third-party gateway for security and privacy, and the deployment agent is configured to obtain the software from the software deployment gateway based on the deployment metadata.

(B1) In one aspect, some examples include a method for servicing a request from a mobile device. The method may include routing, via an edge router associated with an edge datacenter, a communication received from a mobile device to a network address translation appliance, wherein the communication includes a request for content; associating, by the network address translation appliance, an anonymous internet protocol address with an internet protocol address associated with the mobile device; locating, via the edge datacenter, content in response to the request for content received from the mobile device via the network address translation appliance; receiving, at an application gateway for security and privacy, the request for content from the edge datacenter and determining if the request for content is associated with user protected information; routing, by the application gateway for security and privacy, the request for content to a technology partner datacenter when the request for content is not associated with user protected information; providing, by the technology partner datacenter, the requested content to the application gateway for security and privacy; routing, by the application gateway for security and privacy, the requested content to the edge datacenter; and providing the requested content to the mobile device via the network translation appliance and the edge router.

(B2) In some examples of B1, the method further includes determining, by the edge datacenter, whether content requested from the mobile device is cached locally at the edge datacenter.

(B3) In some examples of B1-B2, the method further includes sending, by an edge service implementation of the edge datacenter, the request for content to the application gateway for security and privacy when the edge service implementation determines that the content requested from the mobile device is not cached locally at the edge datacenter.

(B4) In some examples of B1-B3, the method further includes restricting, by the edge router, communication between the edge datacenter and a datacenter located in a region that is jurisdictionally different from the edge datacenter.

(B5) In some examples of B1-B4, the method further includes restricting, by the edge router, communication between the mobile device and a datacenter located in a region that is jurisdictionally different from the edge datacenter.

(B6) In some examples of B1-B5, the technology partner datacenter is at least one of owned or controlled by an entity that is different from an entity that at least one of owns or controls the edge datacenter.

(B7) In some examples of B1-B6, the method further includes generating, by a deployment platform located at the technology partner datacenter, metadata for a software application located within a software repository; providing the deployment metadata to a deployment agent located at the edge datacenter via a third-party gateway for security and privacy; and obtaining, by a deployment agent located at the edge datacenter, the software from the software deployment gateway based on the deployment metadata.

In yet another aspect, some examples include a non-transitory computer-readable storage medium storing one or more programs for execution by one or more processors of a storage device, the one or more programs including instructions for performing any of the methods described herein (e.g., B1-B7 described above).

(C1) In one aspect, some examples include a system for providing an edge computing infrastructure. The system may include a software repository maintained by a technology partner datacenter; a deployment agent at an edge datacenter; a deployment platform at the technology partner datacenter, wherein the deployment platform is configured to generate deployment metadata for a software application located within the software repository, and provide the deployment metadata to the deployment agent located at the edge datacenter via a third-party gateway for security and privacy located at the technology partner datacenter; and a deployment agent configured to obtain the software application from a software deployment gateway located at the technology partner datacenter based on the deployment metadata.

(C2) In some examples of C1, the system includes an edge router configured to route a communication received from a mobile device to a network address translation appliance, wherein the network address translation appliance is configured to associate an anonymous internet protocol address with an internet protocol address associated with the mobile device, wherein the communication includes a request for content, wherein the edge datacenter including an edge service implementation is configured to locate content in response to the request for content received from the mobile device via the network address translation appliance, and provide such located content to the mobile device via the network translation appliance and the edge router, wherein the technology partner datacenter includes a central service implementation configured to provide requested content to the edge datacenter in response to a request for content received from the edge datacenter, wherein an application gateway for security and privacy is configured to receive the request for content from the edge datacenter and determine if the request for content is associated with user protected information, and route the request for content to the technology partner datacenter, and wherein the technology partner is configured to provide the requested content to the edge datacenter via the application gateway.

(C3) In some examples of C1-C2, the edge service implementation is configured to determine whether content requested from the mobile device is cached locally at the edge datacenter.

(C4) In some examples of C1-C3, the edge service implementation is configured to send the request for content to the application gateway for security and privacy when the edge service determines that the content requested from the mobile device is not cached locally at the edge datacenter.

(C5) In some examples of C1-C4, the edge router is configured to restrict communication between the edge datacenter and a datacenter located in a region that is jurisdictionally different from the edge datacenter, and the edge router is configured to restrict communication between the mobile device and a datacenter located in a region that is jurisdictionally different from the edge datacenter.

(C6) In some examples of C1-C5, the technology partner datacenter is at least one of owned or controlled by an entity that is different from an entity that at least one of owns or controls the edge datacenter.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart or process. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for providing an edge computing infrastructure, the system comprising:

an edge router configured to route a communication received from a mobile device to an edge datacenter, wherein the communication includes a request for content;

the edge datacenter including an edge service implementation configured to locate content in response to the request for content received from the mobile device via the edge router, and provide such located content to the mobile device via the edge router;

a technology partner datacenter including a central service implementation configured to provide requested content to the edge datacenter in response to a request for content received from the edge datacenter; and an application gateway for security and privacy configured to receive the request for content from the edge datacenter and determine if the request for content is associated with user protected information, wherein when the request for content is not associated with user protected information, the application gateway for security and privacy is configured to route the request for content to the technology partner datacenter, wherein the technology partner datacenter is configured to provide the requested content to the edge datacenter via the application gateway, wherein the edge service implementation is configured to determine whether content requested from the mobile device is cached locally at the edge datacenter, and wherein the edge service implementation is configured to send the request for content to the application gateway for security and privacy when the edge service implementation determines that the content requested from the mobile device is not cached locally at the edge datacenter.

2. The system of claim 1, wherein the edge router is configured to restrict communication between the edge datacenter and a datacenter located in a region that is jurisdictionally different from the edge datacenter.

3. The system of claim 1, wherein the edge router is configured to restrict communication between the mobile device and a datacenter located in a region that is jurisdictionally different from the edge datacenter.

4. The system of claim 1, wherein the technology partner datacenter is at least one of owned or controlled by an entity that is different from an entity that at least one of owns or controls the edge datacenter.

5. The system of claim 1, further comprising:

a software repository maintained by the technology partner datacenter;

a deployment platform at the technology partner datacenter;

a third-party gateway for security and privacy at the technology partner datacenter;

a deployment agent at the edge datacenter; and a software deployment gateway at the technology partner datacenter, wherein, the deployment platform is configured to generate deployment metadata for a software application located within the software repository, and provide the deployment metadata to the deployment agent located at the edge datacenter via the third-party gateway for security and privacy, and the deployment agent is configured to obtain the software from the software deployment gateway based on the deployment metadata.

\* \* \* \* \*